United States Patent [11] 3,612,211

[72] Inventor William T. Clark, III
 Number Six Davis Blvd., New Orleans, La. 70121
[21] Appl. No. 838,564
[22] Filed July 2, 1969
[45] Patented Oct. 12, 1971

[54] METHOD OF PRODUCING LOCALLY OCCURRING INFRASOUND
7 Claims, 5 Drawing Figs.

[52] U.S. Cl. ..................................................... 181/0.5 J
[51] Int. Cl. ..................................................... G01s 7/52, G10k 10/00
[50] Field of Search ........................................... 186/0.5, 0.5 AG, 0.5 ED, 0.5 J

[56] References Cited
UNITED STATES PATENTS
| | | | |
|---|---|---|---|
| 1,616,639 | 2/1927 | Sprague | 181/0.5 J |
| 1,951,669 | 3/1934 | Ramsey | 181/0.5 J |
| 3,398,810 | 8/1968 | Clark | 181/0.5 J |

Primary Examiner—Malcolm F. Hubler
Attorney—James H. Littlepage

ABSTRACT: Two spaced directional acoustical transducers are directed towards a common point so that the acoustical waves produced thereby intersect throughout a given area. By utilizing a frequency difference between the acoustical waves of less than 20 Hz., or by propagating the acoustical waves at the same frequency while phase modulating one of them at less than 20 Hz., resultant acoustical waves of less than 20 Hz. are produced in the area of intersection.

PATENTED OCT 12 1971 3,612,211
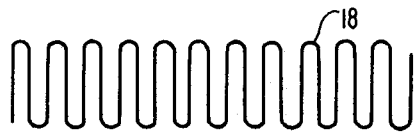
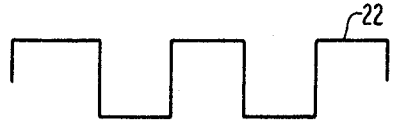
FIG. 2  FIG. 3
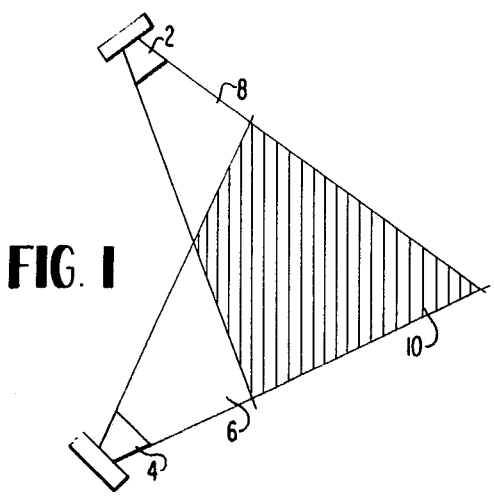
FIG. 1
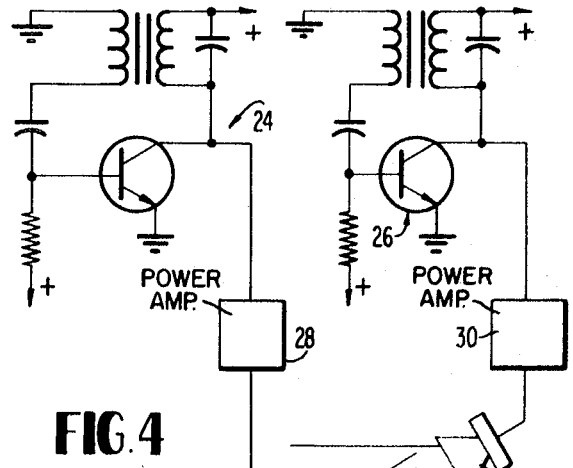
FIG. 4
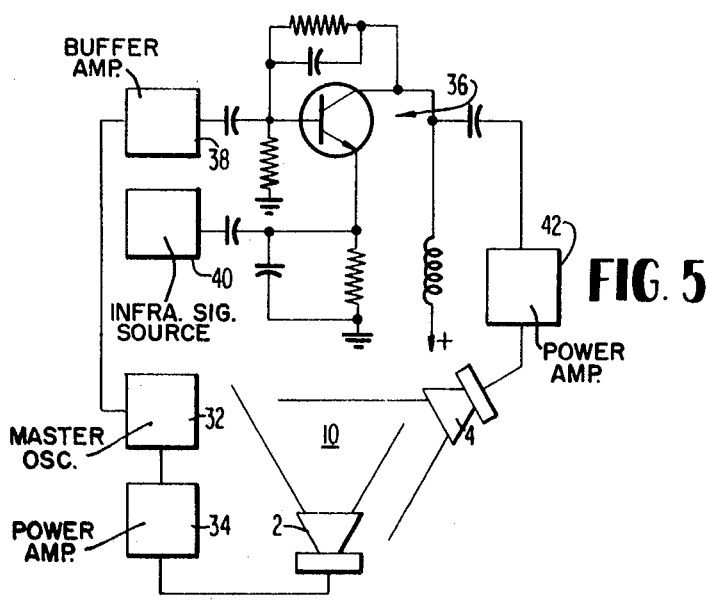
FIG. 5
INVENTOR
WILLIAM T. CLARK, III
BY  *James H. Littlepage*
ATTORNEY 3,612,211

METHOD OF PRODUCING LOCALLY OCCURRING INFRASOUND

FIELD OF INVENTION

Acoustical Systems, Miscellaneous.

PRIOR ART

Sprague U.S. Pat. No. 1,616,639; Ramsey U.S. Pat. No. 1,751,667; Clark, III U.S. Pat. No. 3,398,810; "Infrasound" by V. Gavreau, Science Journal, Jan. 1968.

OBJECTS

It is known that infrasound, i.e., inaudible acoustical waves of less than 20 Hz. can have physiological and neurophysiological effects, and experimental data indicates that those in the range of 5 Hz. to 7 Hz. can effect the alpha wave pattern of the human brain. Experimentation with infrasound has been difficult and dangerous. The length of these waves is so great that extremely large baffles, chambers or whistles have heretofore been necessary to produce them. Their omnidirectional characteristics result in great power losses, since the wave energy from a source is dissipated over a wide area, and it has been difficult, if not impossible, to focus the wave energy on a subject under test; and because of this, the experimenter, as well as the subject, is oftentimes subjected to the same forces, which might be deleterious. Because of the effects of these waves on the human body and brain, it has been theorized that infrasound might be useful in warfare because it cannot be detected by the human ear, and it has a potential for harming or demobilizing an enemy subjected to it.

The object of this invention is to provide a method and apparatus for producing infrasound utilizing two highly directional acoustical wave sources propagating intersecting beams of sound waves at a frequency which may be in the audible range or above, and which waves in and of themselves, because of their frequencies which are higher than infrasound, do not have the same physiological or neurophysiological effects on a subject in their individual paths but which, in their areas of intersection, combine or beat against one another to produce resultant waves in the infrasonic range. A further object is to provide a system for producing infrasound, but utilizing extremely small sources for the infrasound energy, as compared with previously available sources.

These and other objects will be apparent from the following specification and drawing, in which:

FIG. 1 is a diagram illustrating the principle of intersecting beams of acoustical waves;

FIG. 2 is a wave diagram illustrating the simple heterodyne principle which may be utilized for producing an infrasonic beat;

FIG. 3 is a wave diagram illustrating the phase shift principle which may be utilized for producing an infrasonic resultant;

FIG. 4 is a simplified circuit diagram of a system for producing and propagating the heterodyning waves diagrammed in Fig. 2; and, FIG. 5 is a simplified circuit diagram of a system for producing and propagating acoustical waves, one of which is phase modulated as diagrammed in Fig. 3.

Referring first to FIG. 1, there are diagrammatically illustrated two acoustical transducers, which may be pneumatic whistles or oscillator-driven electrical transducers, each producing a directional beam 6 and 8, respectively. The beams intersect in area 10. If the waves in the beams are above the audible range, and if they are of fixed amplitude, and if they are of different frequencies or if they are of the same frequency and one is phase modulated, then a beat or resultant frequency is produced in the area of intersection. This, broadly, is the theory of the system disclosed in my prior U.S. Pat. No. 3,398,810, except that an audible signal was there produced in the area of intersection, and there was no concept of producing physiological or neurophysiological effects in localized areas.

The infrasound produced by intersecting waves in beams 6 and 8 may be produced in various ways. For example, referring to Fig. 2, let it be assumed that the frequency of waves 12 in beam 6 is 30,000 Hz., and of constant amplitude, and the frequency of waves 14 in beam 8 is 29,995 Hz., also at constant amplitude. When the two waves intersect, a beat frequency of 5 Hz. results. Also, two waves, either or both of which are at audible frequencies, could be used if inaudibility were of no importance.

While amplitude modulation of the waves in one beam may be desirable in some applications, if inaudibility in the amplitude modulated beam path is not important, it is essential that the amplitude of the wave in neither beam shall be varied at an infrasonic rate, since then an infrasonic pressure wave would be set up at the source of propagation, and this would produce the undesired effects of power loss, nondirectivity, and danger to the operator.

The diagram of Fig. 3 illustrates the utilization of two waves 18 and 20, both of the same frequency and amplitude, but with phase-shifting of wave 18 so as to produce a resultant acoustical signal 20 of 5 Hz. in the area of intersection. When the in-phase components meet at the intersection, they will add, and out-of-phase components will subtract; and anything in between will add or subtract to a greater or lesser degree. Such addition or subtraction constitutes a compression or rarification of the atmosphere, thereby producing infrasonic waves at the intersection. Similar phase or frequency modulation may be used to produce a "warble" infrasonic wave at the intersection; for example, an infrasonic wave that varies, for example, between 5 and 7 Hz., instead of a steady tone, so as to "bracket" the normal alpha wave frequency of a human subject in the area of intersection. The infrasonic wave may also be "pulsed" by the use of phase or frequency modulation, so long as the amplitude of the waves in neither transmitted beam are varied at an infrasonic rate; and methods for eliminating such variation should be employed.

Suitable means for accomplishing the above results will suggest themselves to those skilled in the art. For example, Fig. 4 is an elementary circuit and block diagram of a system utilizing a transistor oscillator circuit 24 tuned, for example, to 30,000 Hz., another transistor oscillator 26 tuned to 29,995 Hz., and power amplifiers 28 and 30 between the oscillators and their respective transducers 2 and 4.

Fig. 5 is an elementary circuit and block diagram of a system suitable to achieve the objectives of Fig. 3. This system utilizes a master oscillator 32 which feeds a signal of fixed frequency and amplitude to transducer 2 through a power amplifier 34. Master oscillator 32 also supplies a similar signal to a phase modulator 36 through a buffer amplifier 38, which assures that the modulated and unmodulated channels are kept electrically separate.

Controlling phase modulator 36 is a source of infrasound signal 40 which drives the phase modulator in the same manner that an audio signal would drive the phase modulation, but a frequency of, for example 5 Hz. The signal from phase modulator 36 is fed to transducer 4 via power amplifier 42. In both systems, infrasound is produced in the areas 10 of intersection of the two signals.

While the invention described in the foregoing specification has obvious utility for laboratory experimentation, it may also have utility as a military weapon or for riot control, and it may be useful for submarine warfare, in which case intersecting beams could be transmitted through the water and a hull to occupants inside. Also, it is believed that infrasound may influence earthquakes and land mass movement and fault, as well as atmospheric conditions.

I claim:

1. The method of creating infrasound waves in a localized region, which method comprises, transmitting from two spaced points a pair of intersecting beams of acoustical signal waves both being devoid of amplitude modulation at a rate of less than 20 Hz. and both higher in frequency than 20 Hz., and creating in the region of intersection of said beams infrasonic acoustical waves as a result of additive and substractive effects of the intersecting wave fronts of said acoustical signal waves.

2. The method recited in claim 1, wherein the waves in one of said beams are transmitted at a substantially constant frequency and the waves in the other of said beams are transmitted at another constant frequency which differs from the frequency of the first-mentioned frequency by less than 20 Hz.

3. The method recited in claim 2, wherein the differences in frequency between the waves in the two beams is in the range of 5 Hz. to 7 Hz.

4. In the method recited tn claim 3, the step of regularly shifting the difference in frequency between the two beams between 5 Hz. and 7 Hz. to produce an infrasonic warble signal in the area of intersection.

5. The method recited in claim 1, wherein the waves in both of said beams are transmitted at substantially the same frequency, and wherein the waves of one of the beams is phase-modulated by a signal with a frequency of less than 20 Hz.

6. The method as recited in claim 5, wherein the phase modulating signal is in the order of 5 Hz. to 7 Hz.

7. The method recited in claim 6, wherein the phase modulating signal regularly varies between 5 Hz. and 7 Hz. to produce an infrasonic warble signal in the area of intersection.